United States Patent

[11] 3,552,298

[72] Inventors Dale E. Bufkin;
  Willard G. Murphy; Norman A. Beam,
  Macon, Mo.
[21] Appl. No. 817,019
[22] Filed Apr. 17, 1969
[45] Patented Jan. 5, 1971
[73] Assignee McGraw-Edison Company
  Elgin, Ill.
  a corporation of Delaware

[54] DRIP-TYPE COFFEE MAKER
  10 Claims, 4 Drawing Figs.
[52] U.S. Cl. .................................................. 99/281,
  99/306
[51] Int. Cl. .................................................. A47j 31/10
[50] Field of Search .......................................... 99/281,
  282, 283, 300, 304, 305, 306; (Inquired) 219/

[56] References Cited
  UNITED STATES PATENTS
2,011,397  8/1935  Dempster .................... 99/306
2,245,238  6/1941  Watson ....................... 99/281
2,856,843  10/1958  Miklas ........................ 99/282
3,423,209  1/1969  Weber ......................... 99/282
3,463,075  8/1969  Wickenberg .................. 99/282

*Primary Examiner*—Robert W. Jenkins
*Attorney*—Charles F. Lind

ABSTRACT: A drip-type coffee maker with a heating plate having passage means from an upper inlet to a lower outlet, and having a primary heater operable to heat water flowing through the passage means to an outlet temperature sufficient for brewing coffee, a thermostat operable at a given low-limit temperature to energize the primary heater, and a secondary heater effective under continuous operation in normal ambient condition with no water contacting the heating plate to maintain the heating plate above the low-limit temperature to preclude cycling of the primary heater and further with the residual heat in the heating plate to heat even the initial water discharge from the lower outlet to an elevated temperature.

PATENTED JAN 5 1971

Inventors:
Dale E. Bufkin,
Willard J. Murphy,
Norman A. Beam

By Charles F. Lind
Atty.

DRIP-TYPE COFFEE MAKER

Drip-type coffee makers operate by passing near boiling water through a basket holding ground coffee which thereafter drips as liquid coffee into an underlying pot. Some drip-type coffee makers have no heating means so that the water must be heated by an independent source before being poured into the coffee basket. On the other hand, some drip-type coffee makers have heating means for initially heating the water and thereafter discharging it into the coffee basket for brewing. However, these coffee makers commonly have elaborate controls and typically require a time lag between when the water is initially added to the coffee maker and when the water is heated sufficiently to begin the coffee brewing cycle. Because the controls for existing self-heating drip-type coffee makers have been quite complicated and thereby expensive, this appliance has not been widely accepted for domestic use.

The subject invention relates to a self-heating drip-type coffee maker which is economically fabricated and dependably operated. The unit operates in the manner that water, even cold water directly from the tap, can be poured into it whereupon means then meters this water through a heating element having a thermostatically controlled primary heater of sufficient capacity to heat the water to a suitable coffee brewing temperature, but the heating element also has an auxiliary heater which is operated continuously to maintain the heating element hot enough without water to preclude cycling of the primary heater while further having sufficient residual heat to heat with no significant delay even the initial droplets of water passing through the heating element.

A main object of this invention is to provide economically fabricated and dependably operated drip-type coffee maker which is self-heating and which can be always ready for almost instantaneous brewing of coffee.

A more detailed object of this invention is to provide a drip-type coffee maker having a heating means containing a primary heater having sufficient capacity to heat water passing through the heating means to a temperature suitable for proper brewing of coffee and the secondary heater having a capacity sufficient only to maintain the heating means under ambient conditions with no water present at an elevated temperature suitable to preclude cycling of the primary heater and further suitable because of the residual heat therein to give almost instantaneous initial heated water discharge at a temperature suitable for brewing coffee.

These and other objects will be more readily understood and appreciated after reviewing the following specification, the accompanying drawings forming a part thereof, wherein.

Figure 1:
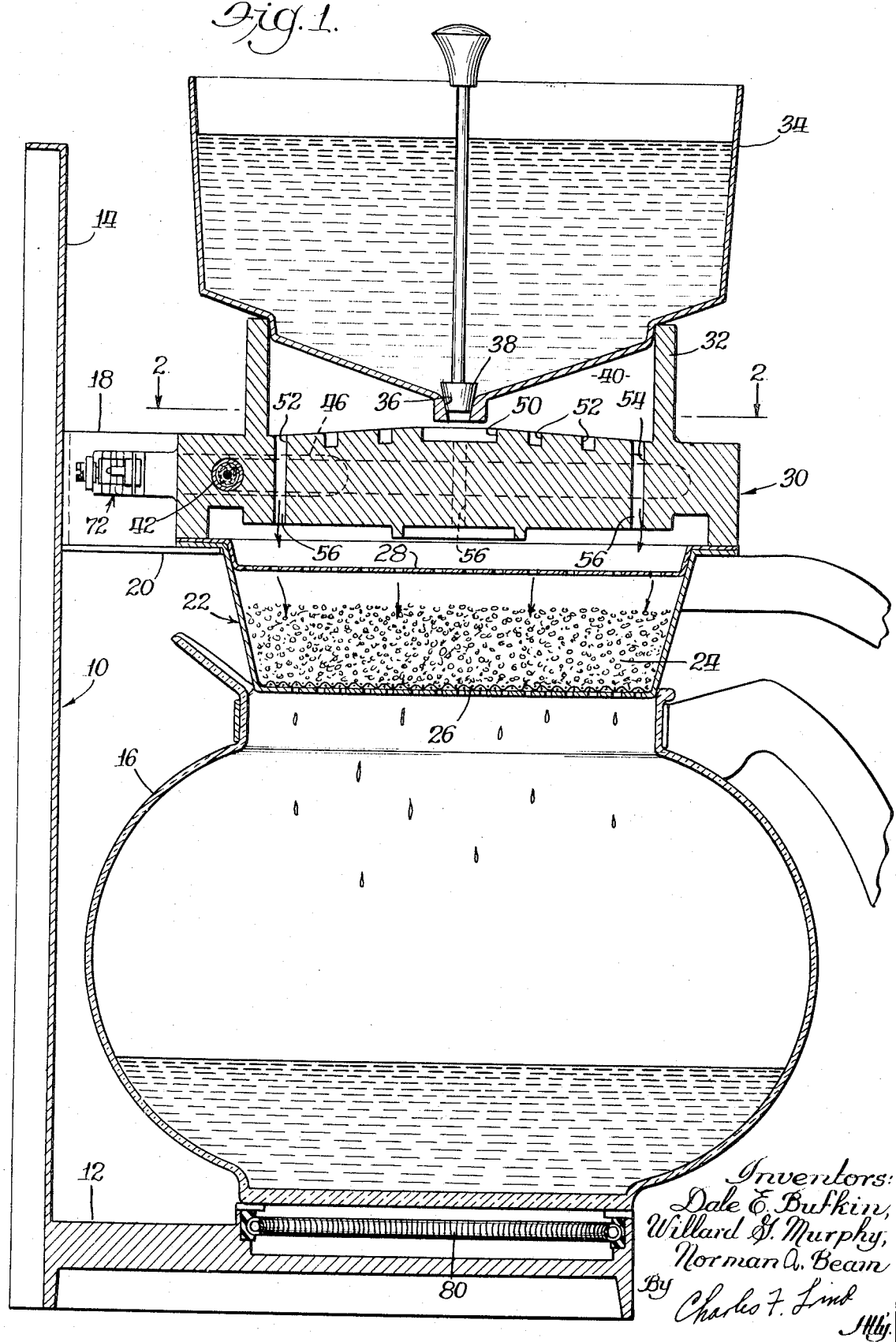
FIG. 1 is an elevational sectional view of a preferred embodiment of the subject drip-type coffee maker showing the unit in its entirety.

Referring now to FIG. 1, the coffee maker shown has a frame 10 including a lower hot plate 12 and an upright back 14. A coffee-receiving vessel or container 16 is supported on the hot plate 12 in a conventional manner. Bracket 18 is supported from the frame back 14 and has spaced tracks 20 (only the one being shown) which slidably receive the flanges of a removable coffee basket 22. Coffee grounds 24 are confined in the basket 22, and openings 26 at the lower side of the basket form outlets for the liquid coffee to drip into the opening top of the underlying vessel 16. A perforated spreader plate 28, slightly dished to receive and distribute heated water uniformly over the coffee, covers the open top of the basket 22.

A heating plate element 30 is supported by bracket 18, the heating plate having upstanding upper peripheral wall 32 which support thereon a water-carrying container or vessel 34. The lower end of vessel 34 has an outlet opening 36 which can be closed by a removable plug 38, and which when opened discharges water into the reservoir inlet 40 defined by the plate within the peripheral upstanding wall 32. A primary heater 42 (FIGS. 2 and 3) is in heat distributing relationship with the heating plate 32, and a thermostat 44 is in heat sensing relationship with the heating plate operable to control the operation of the primary heater 42. A secondary heater 46 is also in heat-distributing relationship thereto with the heating plate.

The upper surface of the heating plate within the confines of peripheral wall 32 has an inlet recess 50 located in alignment beneath the outlet 36 of the supported vessel 34 and four spiral troughs or channels 52 traverse the heating plate from the inlet recess. Each channel is pitched downwardly from the central inlet area 50 to its outer radial end whereat an opening 54 passes through the heating plate 30. The lower side or outlet 56 of each opening 54 is disposed over the deflector plate 28, so that any water from the passage outlets is dropped onto the plate for distribution through the coffee 24 confined in the basket.

Figure 4:
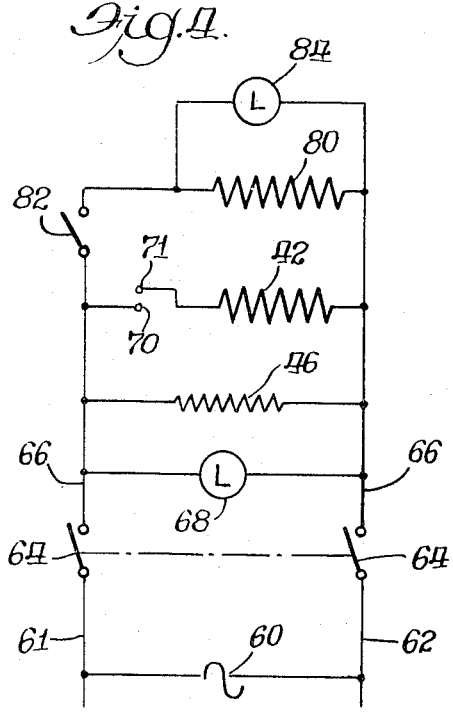
FIG. 4 is a schematic diagram of an electric control suitable for operating the subject coffee maker.

Referring now to FIG. 4, a general schematic suitable for operating the coffee maker is noted where a power source 60 is connected by lines 61 and 62 through a main on-off switch 64 to outlet lines 66, and an on-off indicator lamp 68 is connected across the outlet lines. The auxiliary heater 46 is similarly connected across the outlet lines 66 so that both the lamp 68 and auxiliary heater 46 are energized when the switch 64 is closed. The primary heater 42 is connected across the outlet lines 66 but in series with contacts 70 and 71 of the thermostat 44.

Figure 2:
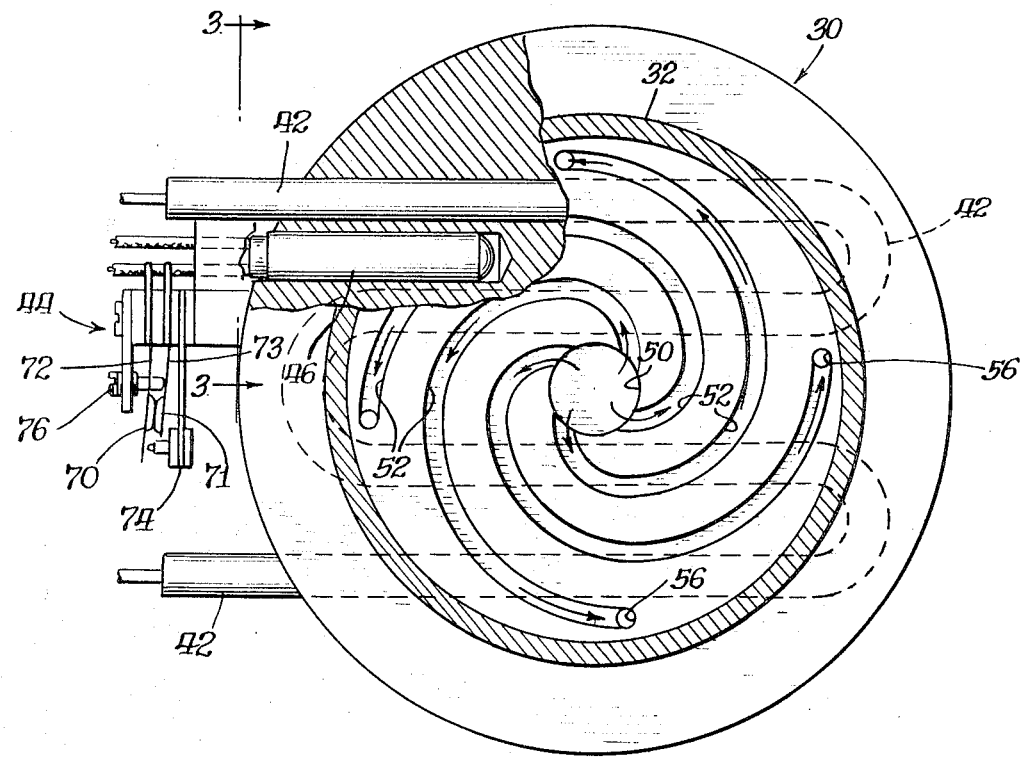
FIG. 2 is a sectional view as seen generally from lines 2-2 in FIG. 1 showing also a part of the heating means broken away and in longitudinal section.
Figure 3:
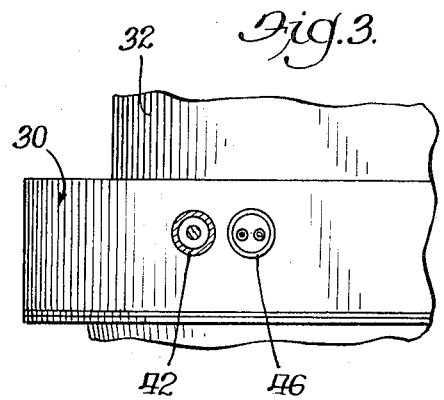
FIG. 3 is and end view as seen generally from line 3-3 in FIG. 2.

In this regard, the thermostat 44 as seen in FIG. 2 has contacts 70 and 71 supported on resilient leaf elements 72 and 73, respectively, to be biased toward one another, and a bimetal leaf element 74 is supported adjacent these contacts. Under varying temperatures, the bimetal element 74 deflects against the one leaf 72 which upon sufficient deflection separates the contacts 70 and 71. The temperature at which the bimetal leaf separates the contacts can be adjusted as required by means of an adjusting screw 76 which engages leaf 73 to position it and consequently the deflected leaf 72 at different distances from the bimetal leaf. The bimetal element 74 senses heat in the heating plate 30 which preferably is of a highly heat-conductive material for maintaining uniform temperatures throughout its entire mass.

The heating element 80 for the hot plate 12 is connected across the outlet line 68 in series with an on-off switch 82 so that separate control of the hot plate is possible independently of the primary heater. An indicator lamp 84 in parallel with hot plate element 80 indicates when the latter is energized.

It is intended that the primary heater 42 have enough heating capacity to heat any water passed through the heating plate passage means 52 and 54 to an outlet temperature at 56 suitable for brewing the coffee confined in the basket. The thermostat 44 normally would have a low-limit temperature such as 150° F. below which the contacts 70 and 71 would be closed to energize the primary heater 42 and would similarly have a high-limit temperature of for example 190° F. above which the thermostat contacts would be opened to deenergize the primary heater. The second heater 46 is of low output, of the order of 40 to 100 watts, and is designed to be operated at all times when the main on-off switch 64 is closed. This secondary heater output maintains the heating plate 30 at an elevated temperature higher than the low-limit temperature sensed by the thermostat when under normal ambient conditions with no water contacting the heating plate.

The unit is designed so that water of almost any temperature can be used, even cold tap water, to fill the vessel 34 to the volume desired. As soon as the plug 38 on the water vessel 34 is removed, water will be discharged to the heating plate inlet. This lowers the thermostat temperature below the low-limit temperature and energizes the primary heater. However, because the heating plate is already preheated by the continuously energized secondary heater 46 and has a residual heat, the water as it is passed by gravity through the openings 54 for discharge from outlets 56 is heated quite extensively. Even so, before the first drops of water are being discharged from the passage outlets 56, the now energized primary heater further heats the water to a suitable discharge temperature for brewing coffee. There consequently is no delay required between when water is initially discharged into the coffee maker and when the coffee-brewing cycle actually begins.

In order to have sufficient capacity in the heating plate without unlimited component costs, it is preferred to have water metering means somewhere between the water vessel 34 and the outlets 56 of the heating plate. This metering means includes having the water vessel opening 36 and the heating plate openings 54 restricted in area to pass only the desired rate of water the heaters are capable of heating to the required outlet temperature.

We claim:

1. In a drip-type coffee maker, the combination comprising a heating element having through passage means, a primary heater for the heating element having an output sufficient to heat liquid passing through the passage means at some determinable rate to an outlet temperature sufficient to brew coffee, a thermostat operable at a low-limit temperature to energize the primary heater, a secondary heater for the heating element having an output sufficient under continuous operation and in normal ambient conditions with no liquid contacting the heating element to raise the thermostat temperature above said low-limit temperature, and means admitting water to the heating element for discharge from the passage means at said determinable rate or less, whereby water initially admitted to the heating element passage means not only causes the thermostat to energize the primary heater but also is heated by the residual heat of the preheated heating element without appreciable delay to an outlet temperature suitable for brewing coffee.

2. A drip-type coffee maker combination according to claim 1, wherein the heating element comprises a generally solid plate having openings therethrough that form the through passage means.

3. A drip-type coffee maker combination according to claim 2, wherein the plate has on the upper surface thereof spiral grooves and further wherein the plate openings extend from the grooves.

4. A drip-type coffee maker combination according to claim 1, wherein a vessel suitable for holding liquid is disposed over the heating element, and wherein the vessel has an outlet suitable for discharging liquid to be admitted to the heating element.

5. A drip-type coffee maker combination according to claim 4, wherein the vessel outlet and the heating element passage means have combined resistances to flow of water effective for metering water flow through the heating element to said mentioned determinable rate or less.

6. A drip-type coffee maker combination according to claim 5, wherein the vessel has a plug suitable for closing the outlet.

7. A drip-type coffee maker combination according to claim 1, wherein a perforated basket is located below the heating element suitable for holding coffee grounds, and wherein a vessel is located below the coffee basket suitable for collecting liquid discharge therefrom.

8. A drip-type coffee maker, comprising a heating element, means for admitting water to the inlet of the heating element, a basket at the outlet of the heating element for holding coffee grounds, a vessel below the coffee basket for collecting liquid discharge therefrom, a primary heater for the heating element having an output sufficient to heat liquid passing from the inlet to the outlet to a temperature sufficient to brew coffee, a thermostat operable at a low-limit temperature to energize the primary heater, and a secondary heater for the heating element having an output sufficient under continuous operation and in normal ambient conditions with no liquid contacting the heating element to raise the thermostat temperature above said low-limit temperature.

9. A drip-type coffee maker according to claim 8, wherein passage means is defined between the heating element inlet and outlet, and wherein said passage means is void of any valve means.

10. A drip-type coffee maker according to claim 9, wherein the means for admitting water to the inlet of the heating element includes a vessel for holding water and having an outlet, and the passage means and the vessel outlet has such combined resistances to flow to preclude discharge from the heating element outlet below a temperature suitable for brewing coffee.